(12) United States Patent
Honjoh

(10) Patent No.: US 6,466,253 B1
(45) Date of Patent: Oct. 15, 2002

(54) STILL IMAGE PRODUCING METHOD AND STILL IMAGE CAPTURE SYSTEM

(75) Inventor: Atsushi Honjoh, Setagaya-ku (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/092,264

(22) Filed: Jun. 5, 1998

(30) Foreign Application Priority Data

Jun. 6, 1997 (JP) ............................................. 9-149029

(51) Int. Cl.[7] .......................... H04N 7/00; H04N 5/225; G03B 17/00; G06K 9/36; G06K 9/32
(52) U.S. Cl. ............................ 348/36; 348/39; 348/42; 348/50; 348/208; 348/218; 348/252; 348/352; 348/169; 348/699; 396/52; 396/55; 396/421; 382/284; 382/300
(58) Field of Search .............................. 348/36, 39, 42, 348/50, 208, 218, 252, 352, 169, 699; 396/52, 55, 421; 382/284, 300

(56) References Cited

U.S. PATENT DOCUMENTS

| | | | | |
|---|---|---|---|---|
| 5,210,559 A | * | 5/1993 | Ohki ........................... 348/208 |
| 5,259,040 A | * | 11/1993 | Hanna ......................... 382/107 |
| 5,438,360 A | * | 8/1995 | Edwards ..................... 348/208 |
| 5,503,153 A | * | 4/1996 | Liu et al. ..................... 600/454 |
| 5,629,998 A | * | 5/1997 | Burt et al. ................... 382/267 |
| 5,646,679 A | * | 7/1997 | Yano et al. .................. 348/218 |
| 5,657,402 A | * | 8/1997 | Bender et al. ............... 348/218 |
| 5,745,173 A | * | 4/1998 | Edwards et al. ............. 348/208 |
| 5,760,846 A | * | 6/1998 | Lee .............................. 348/699 |
| 5,764,283 A | * | 6/1998 | Pingali et al. ............... 348/169 |
| 5,880,778 A | * | 3/1999 | Akagi ......................... 348/218 |
| 5,889,553 A | * | 3/1999 | Kino et al. .................. 348/218 |
| 5,973,733 A | * | 10/1999 | Gove .......................... 348/208 |
| 6,023,300 A | * | 2/2000 | Han et al. ................... 348/699 |
| 6,037,976 A | * | 3/2000 | Wixson ....................... 348/122 |
| 6,133,943 A | * | 10/2000 | Needham ..................... 348/36 |
| 6,320,611 B1 | * | 11/2001 | Pepin ......................... 348/218 |

FOREIGN PATENT DOCUMENTS

| | | | | |
|---|---|---|---|---|
| JP | 5-7336 | | 1/1993 | |
| JP | 05007336 A | * | 1/1993 | ............ H04N/5/235 |
| JP | 05346958 A | * | 12/1993 | ............ G06F/15/70 |

* cited by examiner

Primary Examiner—Wendy R. Garber
Assistant Examiner—John M. Villecco
(74) Attorney, Agent, or Firm—Finnegan, Henderson, Farabow, Garrett & Dunner, L.L.P.

(57) ABSTRACT

A method is disclosed for producing a still image of an object using an image pickup element, which captures an image as a plurality of pixels. The method includes calculating relative displacement amounts between positions of the object on a plurality of frame images taken by the image pickup element, producing a synthesized still image of the object as an image containing an amount of information N times as large as that of each of the frame images using the relative displacement amounts to shift and overlay the plurality of frame images, and carrying out an interpolation processing so that intervals between adjacent pixels distributed on said synthesized still image are substantially the same, by a Fourier series expansion of a distribution state of pixels on said synthesized still image.

16 Claims, 6 Drawing Sheets

STILL IMAGE PRODUCING METHOD AND STILL IMAGE CAPTURE SYSTEM

BACKGROUND OF THE INVENTION

The present invention relates generally to a still image producing method and a still image capture system. More specifically, the invention relates to a still image producing method and a still image capture system, which can capture a plurality of frames images, which are slightly shifted from each other, by utilizing unavoidable vibration, such as the movement of the hands, which usually occurs on ordinary capture conditions, to synthesize the images by a predetermined method to capture a still image of a frame having a high resolution and a low noise, when the still image is captured by means of a sensor, such as a CCD.

With the rapid development of information processing systems, such as personal computers and PDAs (personal digital assistant), and digital communication networks for connecting the information processing systems, the demands for improved techniques for capturing a high-definition image information have been increased. As systems capable of capturing a still image as digital data, digital cameras have come into wide use recently. Therefore, as an example of a technique for capturing still images, a digital camera will be described below.

FIG. 6 is a schematic block diagram of a conventional digital camera. An image to be captured is imaged on an image sensor by means of an optical system. As the optical system, a lens and a stop are used. In addition, as the image sensor, a CCD or a CMOS is used. The image sensor converts an inputted optical information to an electric information, which is outputted as a time series signal. After carrying out the sampling and gain control of the electric information outputted from the sensor, the electric information is converted into digital data by means of an A/D converter. Then, a signal processing for dividing the electric information into a luminance signal and a color signal is carried out by means of a signal processing circuit, and the results thereof are stored in a still image memory. The still image information thus stored is outputted to the outside via an output part, if necessary.

Currently, most of digital cameras use a CCD area sensor as the image sensor. The CCD area sensor comprises photodiodes arranged in the form of a two-dimensional matrix, and CCD analog shift registers. When the photodiodes receive light, the photodiodes produce electrons in accordance with the quantity of the received light to accumulate the electrons therein. The analog shift registers transfer the accumulated electrons to output the electrons as time series signals.

The digital camera is designed to capture a still image, and the still image information outputted from a conventional digital camera is an image information of a single frame. That is, assuming that the exposure time of a sensor is T, an electric information corresponding to the quantity of light received by the respective photodiodes of the sensor between time $t=0$ and $t=T$ is outputted from the sensor only once in time series, and the above described signal processing of the outputted electric information is carried out, so that the digital camera outputs a still image information.

However, in the main current of digital camera, an optical system having a small diameter of ¼ inch type format is adopted in order to meet the demand that the weight and size of the digital camera be reduced. In this case, the diagonal length of the image formed on the image sensor is only about 4.5 mm. On the other hand, CCD sensors having pixels of about 500×800 are adopted to meet the demand of the resolution. That is, photodiodes of about 500×800 are arranged on a CCD sensor. Consequently, the size of one photodiode is as small as 4.5 μm×4.5 μm. Therefore, the number of electrons, which can be produced by the photodiode, is only about 6000 when the exposure time is $\frac{1}{60}$ seconds at an illuminance of 10 luxes, which is ordinary brightness. It is known that a random noise of $n^{1/2}$ occurs when n electrons are produced since the electron producing process is a stochastic process. That is, when n electrons are produced, the S/N ratio is $n/n^{1/2}=n^{1/2}$ so that the S/N ratio decreases as the number of electrons decreases.

With the spread of digital cameras, the enhancement of resolution of digital cameras has been required. In order to take a still image of a high resolution which is equal to a silver halide photograph, the number of pixels must be further increased. However, if the size of the photodiode is reduced in order to increase the number of pixels, the number of produced electrons decreases, so that the S/N ratio further decreases. On the other hand, in order to increase the number of pixels without reducing the size of the photodiode, it is required to enlarge the optical system, so that this does not meet the demand that the weight be reduced.

Thus, in conventional digital cameras, there is a trade-off relationship between the resolution and the S/N ratio due to the random noise, so that it is not possible to take a high definition still image having a high resolution and a low noise while meeting the demand that the weight be reduced.

On the other hand, there is a method using a so-called swing CCD, as a method for improving the resolution without increasing the number of pixels of the CCD. This vibrates the whole CCD at a smaller amplitude than the pixel pitch of the CCD by utilizing a vibrating mechanism, such as a piezoelectric element, to intentionally shift the pixels from each other to picks up an image in order to improves the resolution of the image.

However, it is important for the swing CCD to accurately synchronize the image capture timing with the vibration of the CCD. Therefore, the vibrating mechanism is complicated, and the assembly and adjustment thereof are not easy. Moreover, it is not easy to accurately reproduce ultra micro vibration which is a fraction of the pixel pitch, so that it is not easy to ensure the stability of the system over a long period of time.

SUMMARY OF THE INVENTION

It is therefore an object of the present invention to eliminate the aforementioned problems and to provide an image processing method and a still image capture system, which can take a high definition still image having a high resolution and a high S/N ratio by means of light and simple mechanisms.

According to the present invention, it is possible to take a high definition still image having a high resolution and a low noise by synthesizing frame images, which are slightly shifted from each other by the "incidental movement of an apparatus such as a camera" in taking a picture. It is conventionally conceived that such a "movement of a camera" is a bad and undesired factor to deteriorate images, so that the incidental movement of an apparatus such as a camera is conventionally actively removed. However, the inventor converted the conventional idea to make the present invention after analyzing, in detail, such a "movement of a camera", which unavoidably occurs when taking a still image.

The present invention positively utilizes the "movement of a camera" unlike conventional systems, and is characterized by the improvement of the resolution and S/N ratio of a still image. Such a "movement of a camera" does not match with pixel pitch. Therefore, different points of an object are recorded on the respective pixels on each of frames sequentially shot. Then, if the respective frames are overlapped with each other so that the positions of the object on the frames are overlaid with each other, it is possible to obtain a still image having a greater number of pixels than that of each of the frames.

According to one aspect of the present invention, there is provided a still image producing method for producing a still image of an object by means of an image pickup element capable of capturing-an image as a plurality of pixels, the method comprising the steps of: taking pictures of the object while allowing the relative displacements between the object under substantially the same exposure time with each other and the image pickup element; producing a plurality of frame images being formed by a plurality of pixels so that different points of the object are recorded on the corresponding pixels of at least a predetermined number N (N is a natural number equal to or greater than 2) of frame images of the plurality of frame images; calculating relative displacement amounts between the positions of the object on the plurality of frame images; and overlapping the plurality of frame images after shifting the plurality of frame images from each other on the basis of the relative displacement amounts so that the positions of the object on the plurality of frame images are overlaid with each other, to produce a synthesized still image of the object as an image containing an amount of information, which is N times as large as that of each of the frame images.

According to another aspect of the present invention, a still image capture system comprises: an image pickup element for taking a picture of an object to capture an image as a plurality of pixels; and a signal processing system for calculating relative displacement amounts between positions of the object on a plurality of frame images, each of which is formed by a plurality of pixels shot by the image pickup element, under substantially the same exposure time with each other so that different points of the object are recorded on the corresponding pixels of a predetermined number N (N is a natural number equal to or greater than 2) of frame images of the plurality of frame images, the signal processing system overlapping the plurality of frame images after shifting the plurality of frame images from each other on the basis of the relative displacement amounts so that the positions of the object on the plurality of frame images are overlaid with each other, to produce a synthesized still image of the object as an image containing an amount of information, which is N times as large as that of each of the frame images.

With these constructions, the present invention has the following advantages.

First, according to the present invention, it is possible to capture a high definition still image having improved resolution and random noise while maintaining an optional system of a camera to be small and light.

According to the present invention, in order to obtain such a high definition still image, it is not required to use a so-called swing CCD having complicated mechanisms or an expensive CCD having a large number of pixels. Therefore, the costs can be reduced, and the mechanisms are simple and difficult to break down, so that it is possible to obtain superior reliability.

According to the present invention, it is possible to suitably adjust the balance between resolution and noise in accordance with the type of an object, the picture taking conditions, and the characteristics of an optical system and image sensor of a camera. In addition, the interpolation processing can be carried out any numbers of times as long as data are stored in a sequential still image memory. Therefore, the interpolation processing conditions can be modified using the feedback based on the image quality of the processed still image.

Moreover, according to the present invention, it is possible to capture a high definition still image by means of a simple hardware by positively utilizing the "movement of a camera", which is conventionally conceived that it is bad and undesirable to take a still image. It is enough for this "movement of a camera" to correspond to an order of the picture pitch, so that it is not required to intentionally move the camera. For example, the vibration caused by the pushing operation of the shutter of the camera is enough. However, the present invention can similarly cope with the ordinary "movement of the hands", which is far greater than the vibration caused by the pushing operation of the shutter. Therefore, according to the present invention, it is possible to capture a high definition still image without being careful in the "movement of the hands" in taking a picture. As a result, in comparison with conventional digital cameras, it is far easy to use a digital camera, and it is possible to obtain a higher image quality at low costs.

Thus, according to the present invention, it is possible to easily obtain a high definition still image, so that the invention has great industrial merits.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 5A through 5C are conceptualized views schematically showing an interpolation processing, wherein FIG. 5A is a conceptualized view showing the distribution of signals before an interpolation processing, FIG. 5B is a conceptualized view showing the state that the distribution of signals is uniform after the interpolation processing and that the resolution of a still image is doubled in comparison with the image of each of frames, and FIG. 5C is a conceptualized view showing the state of an improved S/N ratio after the interpolation processing.

DESCRIPTION OF THE PREFERRED EMBODIMENTS

Referring now to the accompanying drawings, the preferred embodiments of the present invention will be described below.

Figure 1A:
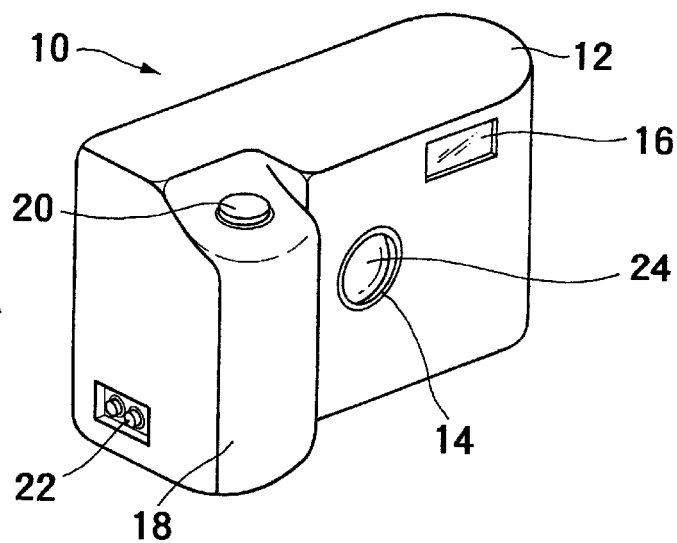
FIG. 1A is a schematic perspective view of a digital camera according to the present invention.
Figure 1B:
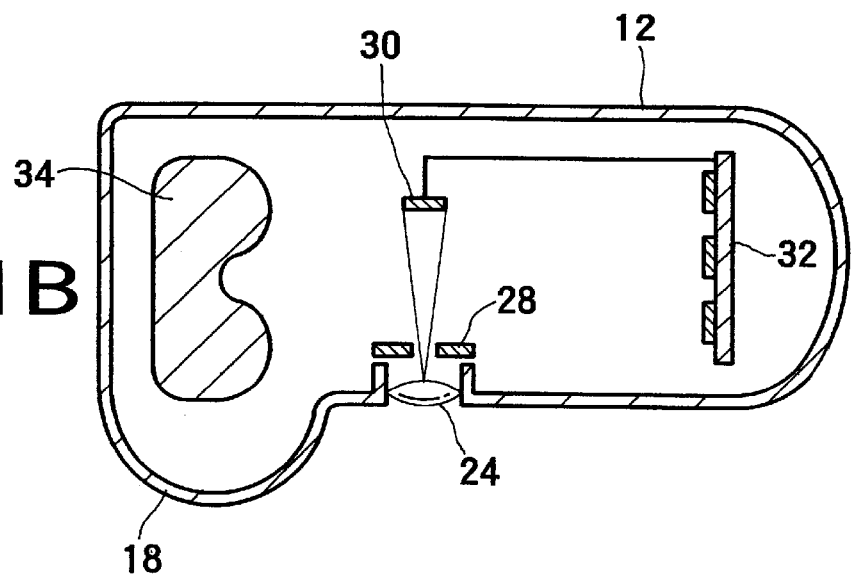
FIG. 1B is a schematic sectional view of the digital camera of FIG. 1A.

FIG. 1A is a schematic perspective view of a digital camera as an example of a still image capture system according to the present invention, and FIG. 1B is a schematic sectional view showing the construction of a principal part of the digital camera of FIG. 1A. As shown in FIG. 1A, according to the present invention, a digital camera 10 comprises a body 12, a lens opening 14, a finder 16, a grip portion 18, a shutter switch 20 and an external output terminal 22. The lens opening 14 is provided with a lens 24. The finder 16 may be a simple optical finder. Alternatively, a display, such as a liquid crystal display, may be provided on the back face (not sown) of the camera so as to serve both as a finder and a monitor for output images.

As shown in FIG. 1B, an iris 28 is provided behind the lens 24 to adjust the quantity of light. The image of an object converged by the lens 24 and the stop 28 is formed on an image sensor 30 serving as an image pickup element. As the image sensor 30, a solid image pickup element, such as a CCD image sensor and a CMOS sensor, is often used. On a circuit board 32, there are provided a drive circuit for controlling the image sensor 30 and a circuit of a signal processing system for processing an output signal of the image sensor 30. To these electronic circuit parts and a power output part for the iris 28 and so forth, a driving power is supplied from a battery 34.

Figure 2:
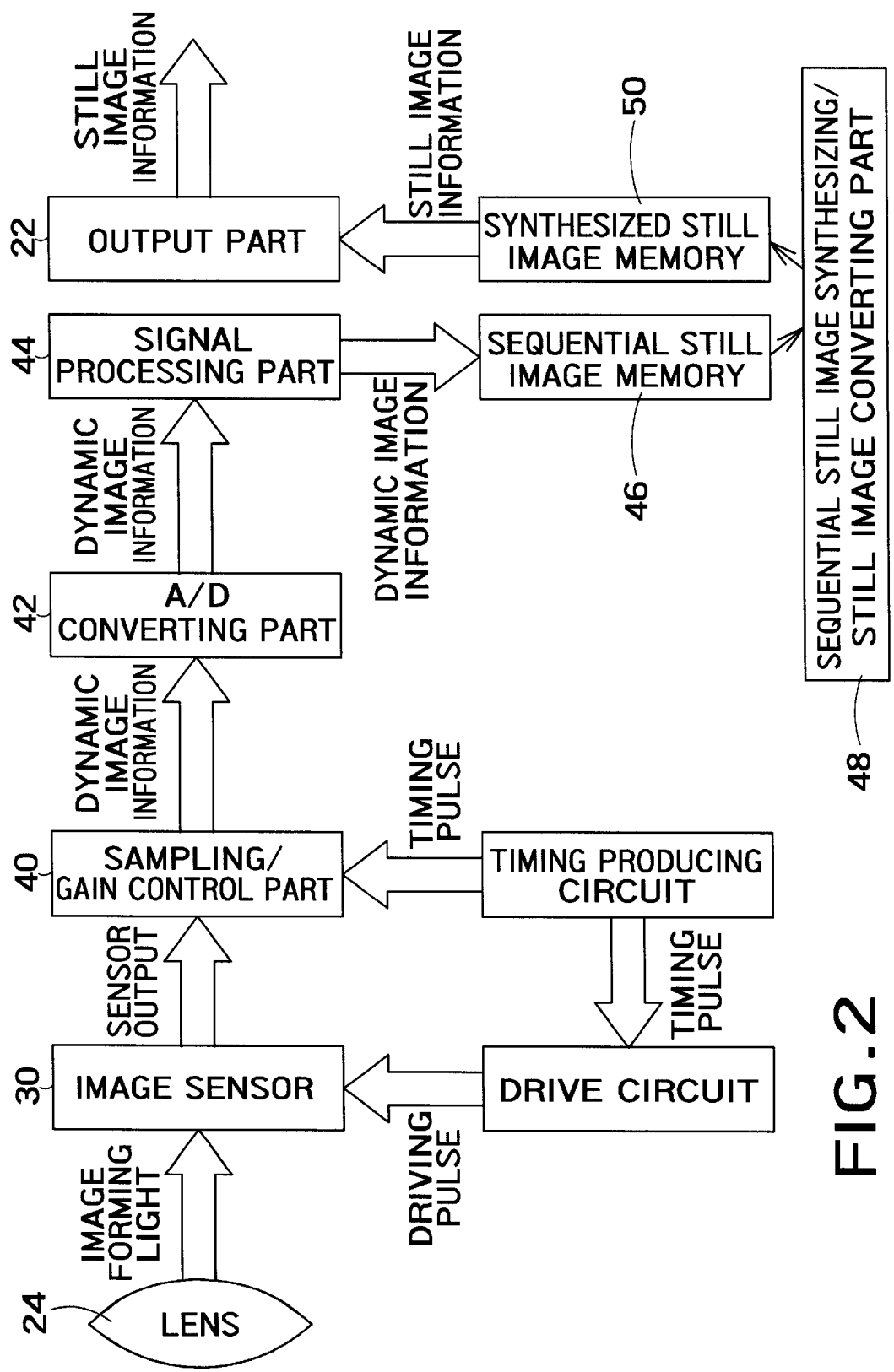
FIG. 2 is a schematic block diagram showing the construction of a digital camera according to the present invention.

FIG. 2 is a schematic block diagram showing the construction of a digital camera according to the present invention. The digital camera of the present invention is designed to capture a still image similar to conventional cameras. However, when the digital camera according to the present invention captures a single still image, the image sensor 30 sequentially captures and outputs a plurality of sequential frames as if a movie camera is used. Similar to conventional digital cameras, the image data of the respective frames sequentially outputted from the image sensor 30 are stored in a memory 46 via a sampling/gain control part 40, an A/D converting part 42 and a signal processing part 44. However, in the case of conventional cameras, image data of one frame are stored in a memory corresponding to the memory 46. On the other hand, in the case of the camera of the present invention, image data of a plurality of frames are stored in the memory 46. Therefore, throughout the specification, data of a plurality of frames will be collectively referred to as a "sequential still image (dynamic image) information", and the memory 46 for storing these data therein will be collectively referred to as a "sequential still image (dynamic image) memory", in order to clearly distinguish the data and memory 46 of the present invention from those of conventional cameras.

As an example, assuming that the exposure time, i.e., the storage time, for each frame is 1/60 seconds and that the number of frames N is 100, the image capture process will be described. In this case, the image sensor 30 converts the optical information of each of frames, which are shot when time t is 0 second$\leq$t$\leq$1/60 seconds, 1/60 seconds$\leq$t$\leq$2/60 seconds, . . . , 99/60 seconds$\leq$t$\leq$100/60 seconds, respectively, to an electric information to sequentially output the resulting electric information. The total time required to shoot these 100 frames is 100/60 seconds, i.e., about 1.7 seconds. The exposure time, i.e., the storage time, of each of the frames may be different. However, if the storage times of the frames are substantially the same to maintain substantially the same luminance level, it is convenient for the synthesis of the frames, which will be carried out later.

When taking a picture, the camera is supported by the hands or fixed to a support, such as a tripod. In either case, the sequential still image information sequentially taken contain some "movement of a camera" as described above. It is conventionally conceived that such a "movement of a camera" is a bad and undesired factor, which deteriorates images, so that the "movement of a camera" is conventionally actively removed. However, one feature of the present invention is that the resolution and S/N ratio of a still image are improved by utilizing the "movement of a camera" unlike conventional cameras.

That is, as shown in FIG. 2, in the digital camera according to the present invention, the image data of a plurality of frames stored in the sequential still image memory 46 are synthesized to a single still image by means of a sequential still image synthesizing/still image converting part 48. If the image data of the respective frames containing the "movement of the camera" are thus a synthesized by means of the sequential still image synthesizing/still image 48 by a predetermined method, a high definition still image can be obtained. The synthesized still image data are stored in a still image memory 50, and outputted to the outside via the output part 22, if necessary.

Figure 3:
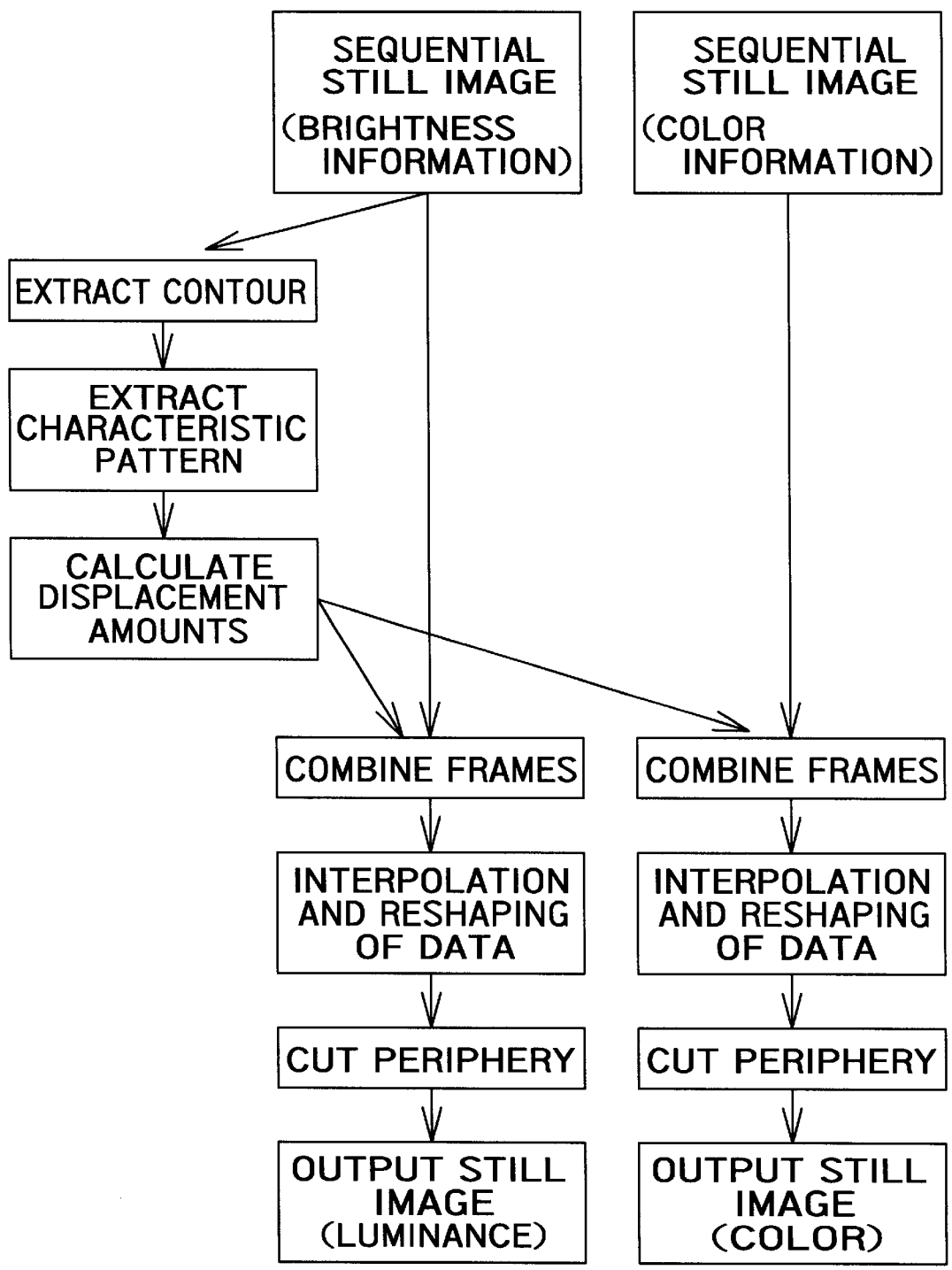
FIG. 3 is a schematic block diagram showing a processing algorithm in a sequential still image synthesizing/still image converting part according to the present invention.

FIG. 3 is a schematic block diagram showing an example of a processing algorithm in the sequential still image synthesizing/still image converting part 48 according to the present invention. The sequential still image information, i.e., the information of N frames, is divided into brightness information and color information to be stored in the sequential still image memory. Y signals are stored as the brightness information, and R signals (red), G signals (green) and B signals (blue) are stored as the color information. Assuming that the number of photodiodes of the CCD sensor is $N_x \times N_y$, the Y, R, G and B signals forming the sequential still image information of N frames can be expressed as the following function of the corresponding coordinates $n_x$, $n_y$, and frame number $n_t$:

| Luminance Signal: | $Y(n_x, n_y, n_t)$ |
| --- | --- |
| P signal: | $R(n_x, n_y, n_t)$ |
| G signal: | $G(n_x, n_y, n_t)$ |
| B signal: | $B(n_x, n_y, n_t)$ | wherein $1 \leq n_x \leq N_x$, $1 \leq n_y \leq N_y$, and $1 \leq n_t \leq N$.

wherein $1 \leq n_x \leq N_x$, $1 \leq n_y \leq N_y$, and $1 \leq n_t \leq N$.

According to the present invention, as shown in FIG. 3, the contour extraction is carried out on the basis of, e.g., the Y signals, for each frame. That is, the contour of a pattern transcribed on each frame is recognized on the basis of the luminance signals. The reasons why the contour extraction is carried out on the basis of the Y signals are that the contour of an image is often most clearly indicated by the luminance signals, and that there is a problem in that the resolution deteriorates if the contour is extracted every color since each of the photodiodes of the CCD is distributed to K, G and B so that the number of pixels of each color is one third of the total number of pixels. However, the present invention should not be limited to the counter sampling carried out using only the Y signals.

For example, when an object is formed by only red (R) and green (G) and when the luminance of R approximates to that of G, it is advantageous to carry out the contour extraction on the basis of the R and G signals instead of the Y signals. In the case of a so-called three-plate type CCD camera or the like, the resolution does not deteriorate even if the contour is extracted on basis of any color signal. Therefore, the kinds of signals, which are used to carry out the contour extraction, can be suitably selected in accordance with the distribution state of colors of the object and the kind of the camera. This is the same with respect to a characteristic pattern extracting step and a displacement amount calculating step, which will be described later.

Then, as shown in FIG. 3, a characteristic pattern is extracted from the extracted contour. The characteristic pattern means a pattern which has a sharp contour, the coordinates of which can be clearly identified. For example, the characteristic patterns include an intersection of lines, a corner of a line, and a luminescent spot.

After extracting the characteristic pattern, the relative displacement amounts are derived for each frame. That is, even if the pictures of the same object are sequentially taken, if the "movement of the camera" occurs when taking the pictures, the positions of the object in the respective frames are different from each other.

For example, when K characteristic patterns in common between frames are extracted, the coordinates of these characteristic patterns can be expressed as follows:

$$(X(k, n_t), Y(k, n_t))$$

wherein k is an integer in the range of $1 \leq k \leq K$, which indicates a number of the characteristic pattern, and $n_t$ is a frame number. In order to simplify explanation, it is assumed that the "movement of a camera" in taking a picture is only a parallel movement and does not include rotation and distortion of the object itself. Then, the displacement amount of the $n_t$ th frame with respect to the first frame can be indicated by only the X and Y components on plane coordinates. The X and Y components of the relative displacement amount vector $\Delta(k, n_t)$ of the $n_t$ th frame, which are calculated by the k th characteristic pattern of the extracted K characteristic patterns, can be expressed as follows.

X component of $\Delta(k, n_t)$: $(X(k, n_t) - X(k, 1))$

Y component of $\Delta(k, n_t)$: $(Y(k, n_t) - Y(k, 1))$

In order to enhance the reliability of the calculated values of the relative displacement amounts of the frames, it is desired to calculate the displacement amounts of all the characteristic patterns for each frame to average the calculated displacement amounts. That is, the relative displacement amount $\Delta(n_t)$ of the $n_t$ th frame can be expressed by the undermentioned formula as an average value of the displacement amounts calculated from all the K characteristic patterns:

$$\Delta(n_t) = \Sigma \Delta(k, n_t)/K$$

wherein the addition expressed by the sum symbol $\Sigma$ is carried out in the range of from k=1 to k=K. The displacement amount $\Delta(n_t)$ thus obtained is often a value which is out of the pixel pitch of the CCD, since it is an average value calculated by the K characteristic patterns. That is, the displacement amount of each characteristic pattern is spatially quantified by the respective pixels of the DDC to be often integer times as large as the pixel pitch. However, if the displacement amounts are averaged in accordance with the above formula, it is possible to derive a more accurate displacement amount which is out of integer times as large as the pixel pitch. In addition, if the displacement amount being out of the pixel pitch can be derived, the respective frames can be synthesized after shifting the pixels, so that the resolution can be improved.

Then, as shown in FIG. 3, the N frames are combined on the basis of the calculated relative displacement amounts. That is, the respective frames are overlapped with each other while being put back by the respective relative displacement amounts $\Delta(n_t)$, to synthesize a single still image. The combination of the respective frames is carried out with respect to the brightness information and the color information, respectively. Although the respective frames are object information which are taken at different times, the differences between times are disregarded since it is an object of the present invention to capture a still image.

In order to simplify explanation, it will be hereinafter supposed that all of the displacement amounts of the N frames are different and not zero. That is, it will be supposed that when the N frames are combined, the luminance signals Y of the N frames are not overlapped with each other and are not expressed by a multivalued function.

The distribution of the luminance signals Y (x, y) on the synthesized still image, which is thus obtained by combining the frames, can be expressed by the following formula:

$$Y(x, y) = Y(n_x, n_y, n_t)$$

(when $x = X_p n_x - \Delta x(n_t)$ and $y = Y_p n_y - \Delta y(n_t)$)

wherein $X_p$ and $Y_p$ are pixel pitches in X and Y directions on an image, respectively, the pixel pitches corresponding to the pitches of the photodiodes of the CCD, and $n_x$ and $n_y$ are numbers of pixels in x and y directions on the frame, respectively, and $\Delta x(n_t)$ and $\Delta y(n_t)$ being x and y components of the relative displacement amount $\Delta(n_t)$ of the $n_t$ th frame, respectively.

As can be seen from the above formula, the luminance signals on the synthesized still image after combination only have brightness information at positions shifted from the respective pixels of the first frame by $\Delta x(n_t)$ in the x direction and by $\Delta y(n_t)$ in the y direction on each frame. That is, the number of pixels substantially increases. Such combination is also carried out with respect to the R, G and B signals serving as color information.

Figure 4A:
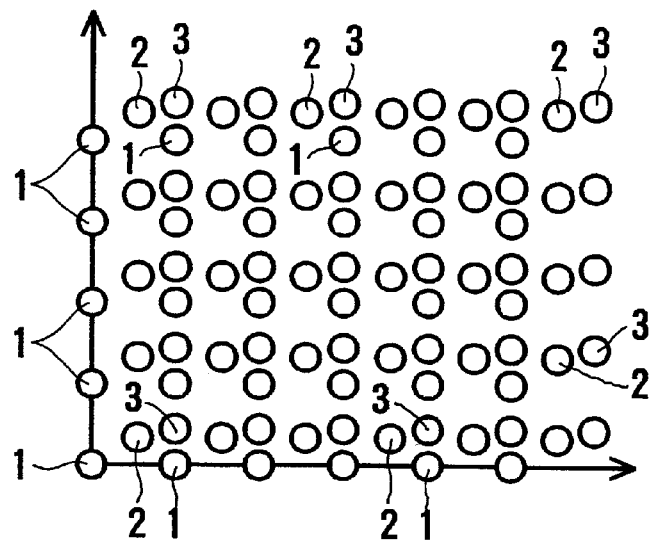
FIG. 4A is a view showing an example of a two-dimensional distribution state of signals on an image obtained by combining frames.

FIG. 4A is a view showing an example of a distribution state of signals on an image obtained by combining frames. FIG. 4A shows the case where the number of frames N=3, for simple explanation. In addition, the respective signal points are numbered by frame numbers for the sake of convenience. The displacement amounts of the respective frames caused by the "movement of the hands" and physical vibration when taking pictures are generally uniform. Therefore, as shown in FIG. 4A, the distribution state of signals after combination is often spatially uniform. Also in such a state, the number of pixels increases, so that the resolution of the still image is improved. Therefore, when information on the distribution of pixels as well as luminance signal data and color signal data are supplied, the obtained still image can be utilized as a high definition still image.

Figure 4B:
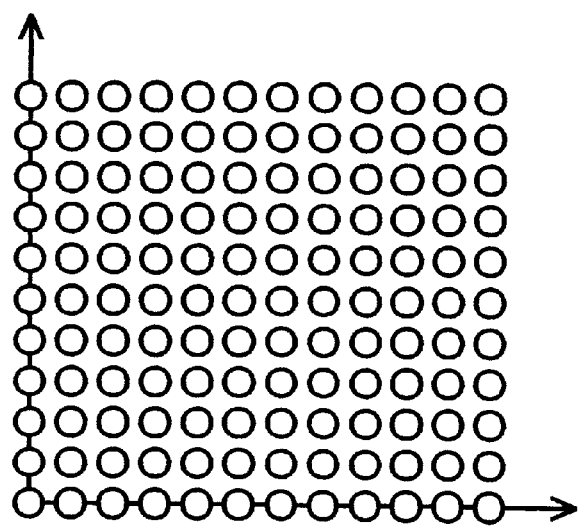
FIG. 4B is a view showing an example of a desired distribution of signals as a still image data when being outputted from a digital camera to the outside.

On the other hand, FIG. 4B is a view showing an example of a desired distribution of signals as still image data outputted from a digital camera to the outside. In FIG. 4B, the resolution of each frame shown in FIG. 4A is doubled. As a practical still image information, it is desired that signals are two-dimensionally uniformly distributed as shown in FIG. 4B. Therefore, the intervals between signals, which are ununiformly distributed as shown in FIG. 4A, are interpolated to synthesize a uniform distribution of signals as shown in FIG. 4B. In order to carry out this, it is enough for the number of synthesized frames to be $m^2$ (m is a natural number equal to or greater than 2). According to the present invention, it is possible to obtain a still image, which has a resolution multiplied by m, by carrying out the same processing after synthesizing $m^2$ or more frames.

Such synthesis of a distribution of signals is often called interpolation processing. The interpolation processing methods include a method using the Fourier series expansion and a method using the polynomial approximation or the linear approximation. The interpolation method using the Fourier series expansion will be described below.

First, the following function Y' (x, y), which is capable of being integrated, is defined using the Dirac's δ function:

$$Y'(x, y) = Y(x, y)\delta(X_p n_x - \Delta x(n_t) - x) \cdot \delta(Y_p n_y - \Delta y(n_t) - y)$$

wherein Y' (x, y) is a function, which has an integration average equal to Y (x, y) near an optional point, at which Y (x, y) is defined, and which has integrated values of zero near the other points.

Then, the function Y (x, y) is expanded into a two-dimensional Fourier series (a half interval). Assuming that the function after interpolation is Y" (x, y), the following formulae can be obtained.

$$Y''(x, y) = \sum_{m,n} a_{m,n} \sin\left(\frac{m\pi x}{X_p N_x}\right) \sin\left(\frac{n\pi y}{Y_p N_y}\right)$$

$$a_{m,n} = \frac{4}{N_x N_y N} \cdot \int\int Y'(x,y) \sin\left(\frac{m\pi x}{X_p N_x}\right) \sin\left(\frac{n\pi y}{Y_p N_y}\right) dx\, dy$$

$$= \frac{4}{N_x N_y N} \sum_{n_x, n_y, n_t} Y(n_x, n_y, n_t) \sin\frac{m\pi(X_p \cdot n_x - \Delta_x(nt))}{X_p N_x}$$

$$\sin\frac{n\pi(Y_p \cdot n_y - \Delta_y(nt))}{Y_p N_y}$$

This Fourier series has the amount of information N times as large as the amount of information of one frame for the original sequential still image.

In order to improve the resolution of the still image, it is assumed that the number of items of the Fourier series is $N \times N_x \times N_y (1 \leq m \leq N_x \times N^{1/2}$ and $1 \leq n \leq N_y \times N^{1/2})$. If the luminance distribution Y ($n_x$, $n_y$) ($1 \leq n_x \leq X_n \times N^{1/2}$ and $1 \leq n_y \leq Y_n \times N^{1/2}$) of the still image is calculated by the undermentioned formula, the number of terms of the series is equal to the amount of information, so that a still image having a resolution $N^{1/2}$ times as large as that of the original frame image can be obtained.

$$Y''(n_x, n_y) = Y''(n_x/N^{1/2}, n_y/N^{1/2})$$

Figure 5A:
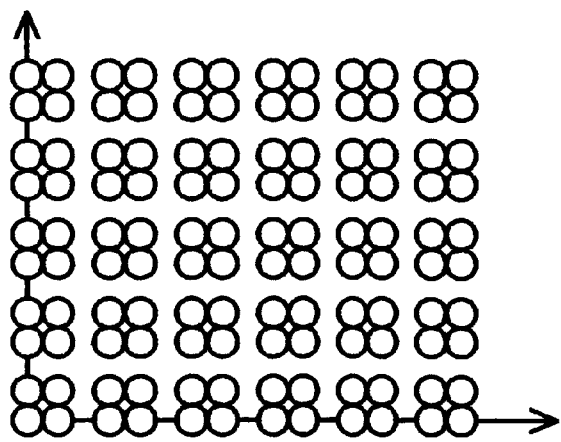
Figure 5B:
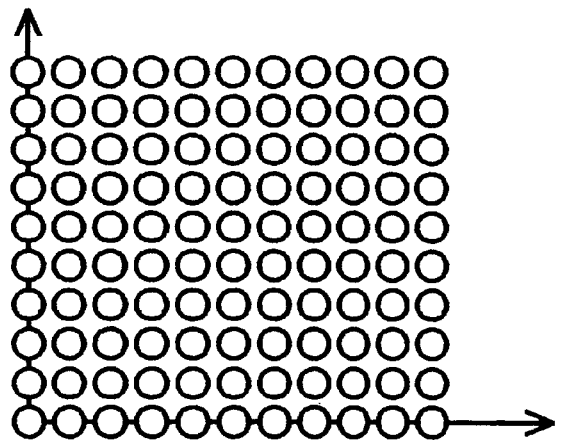
Figure 5C:
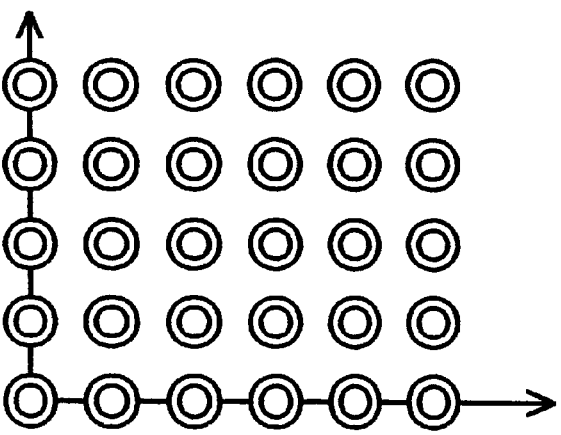
Figure 6:
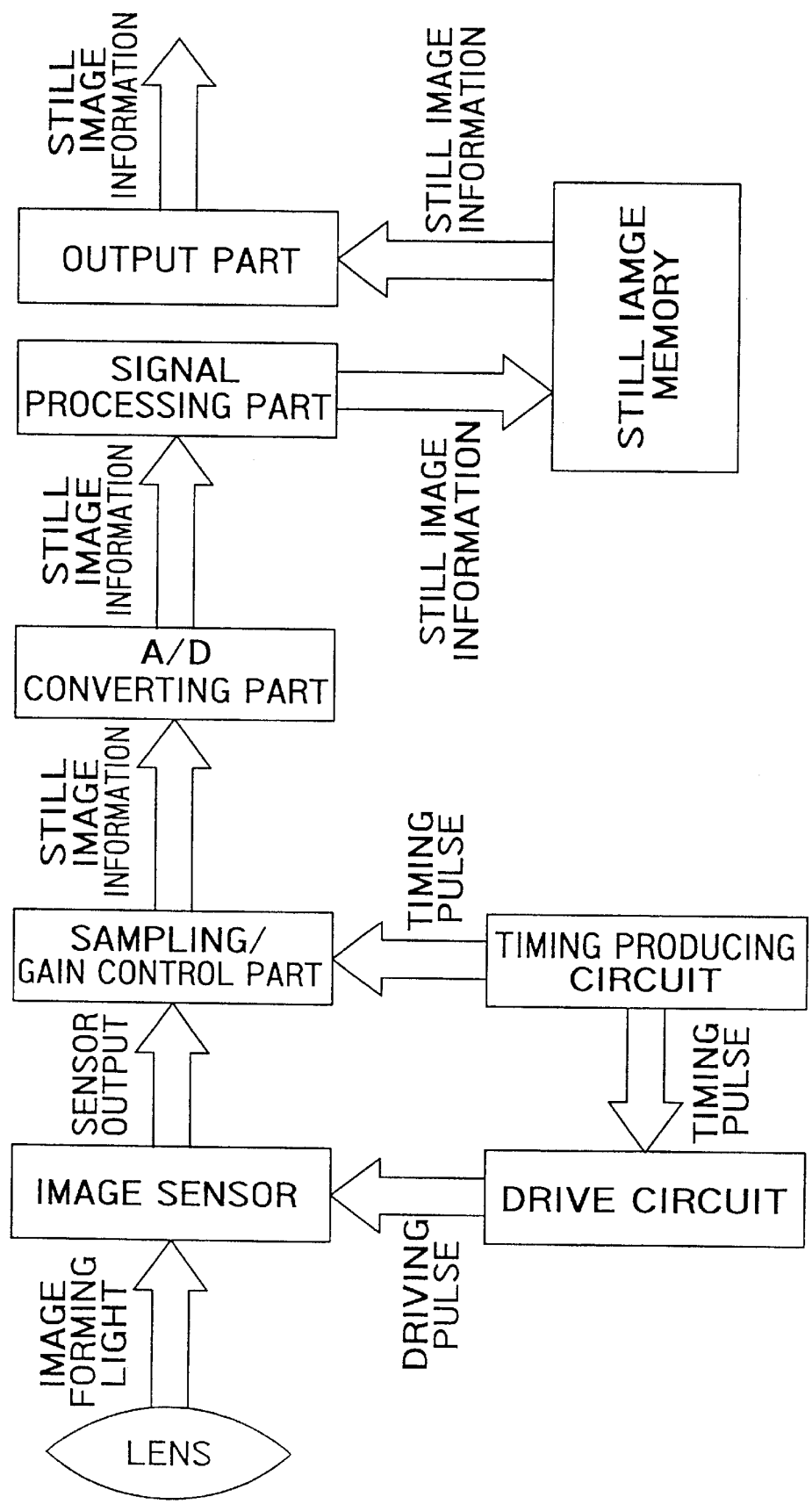
FIG. 6 is a schematic block diagram showing the construction of a conventional digital camera.

FIGS. 5A through 5C are conceptualized views schematically showing such an interpolation processing. That is, FIG. 5A shows the distribution of signals before an interpolation processing. For simple explanation, FIG. 5A shows the distribution of signals of an image obtained by combining $2^2=4$ frames. When the above described interpolation processing of the image having such a distribution is carried out, the distribution of signals is uniform and the resolution of a still image is doubled in comparison with the image of each frame as shown in FIG. 5B.

On the other hand, in a case where the noise of a still image is reduced, it is assumed that the number of terms of the series is $X_n \times Y_n (1 \leq n_x \leq X_n$ and $1 \leq n_y \leq Y_n)$. If the luminance distribution Y ($n_x$, $n_y$) ($1 \leq n_x \leq X_n$ and $1 \leq n_y \leq Y_n$) of the still image is calculated by the undermentioned formula, the number of terms of the series is the same as the amount of information of one frame for the original sequential still image, so that the resolution is not improved. However, if a smooth function is applied by a low degree Fourier series, it is possible to obtain a still image having a reduced random noise $1/N^{1/2}$ times as large as that of the original sequential still image.

$$Y''(n_x, n_y) = Y''(n_x, n_y)$$

FIG. 5C is a conceptualized view showing the distribution of signals of the still image obtained by the above described interpolation processing. That is, the interpolation processing of the distribution of signals shown in FIG. 5A is carried out to obtain the still image having the distribution shown in FIG. 5C. As shown in this figure, although the resolution of the obtained still image is the same as that of each frame, the amount of original signals at the respective points is increased to improve the S/N ratio.

On the other hand, if the above described two intermediate processings are carried out, it is possible to obtain a still image having both of improved resolution and random noise in comparison with those of each frame for the original sequential still image. That is, the balance between resolution and noise can be suitably adjusted in accordance with the type of the object, the picture taking conditions and the characteristics of the optical system and image sensor of the camera.

In addition, the interpolation processing can be carried out any number of times as long as data are stored in the sequential still image memory. Therefore, the interpolation processing conditions can be modified by the feedback based on the image quality of the processed still image.

According to the above described interpolation using the Fourier series expansion, there is an advantage in that the accuracy of the interpolation is higher than that of the linear approximation when the displacement amounts of the respective frames are uneven.

The peripheral portion of the still image thus synthesized has a small amount of information due to the movement of the camera. In addition, in the case of the interpolation utilizing the Fourier series, the accuracy of the peripheral portion is bad due to the property thereof. Therefore, such a peripheral portion is cut from the still image to obtain a final still image.

While the color camera has been described as an example, the present invention should not be limited thereto. The present invention may be also applied to a monochrome camera. In this case, only the Y signals are processed. A Moreover, while the present invention has been applied to the digital camera, the invention should not be limited thereto, but the invention may be applied to any systems for capturing a still image of an object as electric information by means of an image sensor, such as a CCD and a CMOS.

In addition, the color signal system should not be limited to the R, G, B color system. For example, the present invention may be applied to a signal system of complementary colors of Ye (Yellow), Cy (Cyan) and Mg (Magenta) or a signal system containing G (Green) added thereto:

While the above described digital camera has had the sequential still image memory, the output of the signal processing part may be directly outputted to the sequential still image synthesizing/still image converting part without the need of the sequential still image memory. In addition, the converted still image may be directly outputted to the outside without providing the synthesized still image memory in the digital camera.

While the signal processing part and the sequential still image synthesizing/still image converting part (the signal processing system) have processed the digital data, the analog processing may be carried out without the need of the A/D converting part.

While the contour and characteristic pattern have been extracted from the respective frames forming the sequential still images to derive the displacement amounts in the above described embodiment, the displacement amounts of the respective frames may be derived by other methods. For example, the camera may be provided with an angular velocity/velocity sensor, and the displacement amounts of the respective frames may be derived by monitoring the output of the angular velocity/velocity sensor when taking a picture. Alternatively, the camera may be provided with a dedicated image sensor for deriving the displacement amounts.

Moreover, while the plurality of frame images sequentially shot have been used to synthesize a still image, a plurality of frame images, which are not sequentially shot, such as frame images obtained by electronic shutter operations, may be used.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A still image producing method for producing a still image of an object by means of an image pickup element, which captures an image as a plurality of pixels, said method comprising:

taking pictures of said object while allowing a relative displacement between said object and said image pickup element;

producing a plurality of frame images, each of which is formed by a plurality of pixels, so that different points of said object are recorded on the corresponding pixels of at least two or more frame images of said plurality of frame images;

calculating relative displacement amounts between positions of said object on said plurality of frame images;

producing a synthesized still image of said object as an image containing an amount of information N (N being a natural number equal to or greater than 2) times as large as that of each of the frame images by overlapping said plurality of frame images by overlapping said plurality of frame images after shifting said plurality of frame images from each other so that said positions of said object on said plurality of frame images are overlaid with each other on the basis of said relative displacement amounts; and carrying out an interpolation processing so that intervals between adjacent pixels distributed on said synthesized still image are substantially the same, by a Fourier series expansion of a distribution state of pixels on said synthesized still image.

2. A still image producing method according to claim 1, wherein carrying out said interpolation processing comprises:

obtaining a resolution $N^{1/2}$ times as large as that of each of said plurality of frame images by distributing pixels on said synthesized still image as $f(x/N^{1/2}, y/N^{1/2})$ assuming that the number of terms of said Fourier series is the product of the number of said plurality of frame images and the predetermined number N (N being the number of frame images, on the corresponding pixels of which different points of said object are recorded, out of said plurality of frame images) and assuming that said Fourier series is $f(x, y)$.

3. A still image producing method according to claim 1, wherein carrying out said interpolation processing, comprises:

obtaining a higher S/N ratio than that of each of said plurality of frame images by distributing pixels on said synthesized still image as $f(x, y)$ assuming that the number of terms of said Fourier series is equal to the number of said plurality of frame images and assuming that said Fourier series is $(x, y)$.

4. A still image producing method according to claim 1, wherein calculating said relative displacement amounts, comprises:

extracting a contour of said object on each of said plurality of frame image;

obtaining a characteristic pattern of said contour on each of said plurality of frame images, the position of said characteristic pattern capable of being identified on each of said plurality of frame images; and obtaining relative displacement amounts between said positions of said object on said plurality of frame images by dividing the position of said characteristic pattern on each of said plurality of frame images.

5. A still image producing method according to claim 4, wherein calculating said relative displacement amounts, comprises:

extracting said characteristic pattern on each of said plurality of frame images every a predetermined number M (M being a natural number equal to or greater than 2) of characteristic patterns; and deriving the position of said characteristic pattern on each of said plurality of frame images for each of said predetermined number M of characteristic patterns, to calculate said relative displacement amounts between said positions of said object on said plurality of frame images as average values of relative displacement amounts of said predetermined number M of characteristic patterns.

6. A still image producing method according to claim 1, wherein producing a plurality of frame images, comprises dividing each of said plurality of frame images to produce a plurality of luminance signal frame images, each of which is formed by luminance signals, and a plurality of color signal frame images, each of which is formed by color signals; and wherein calculating said relative displacement amounts, comprises calculating relative displacement amounts between said positions of said object on any one of said plurality of luminance signal frame images and said plurality of color signal frame images.

7. A still image producing method according to claim 6, wherein producing a synthesized still image, comprises:

producing a single luminance signal synthesized still image by overlapping said plurality of luminance signal frame images after shifting said plurality of luminance signal frame images from each other so that said positions of said object are overlaid with each other on the basis of said relative displacement amounts; and producing a single color signal synthesized still image by overlapping said plurality of color signal frame images after shifting said plurality of color signal frame images from each other so that said positions of said object are overlaid with each other an the basis of said relative displacement amounts.

8. A still image producing method according to claim 1, wherein producing said plurality of frame images, comprises producing each of said plurality of frame images by recording for substantially the same exposure time to be produced.

9. A still image capture system including an image pickup element for taking a picture of an object to capture an image as a plurality of pixels, and a signal processing system for processing said picture by converting said image containing said plurality of pixels captured by said image pickup element into image signals, said signal processing system comprising:

a frame image producing part to produce a plurality of frame images, each of which is formed by said plurality of pixels and shot by said image pickup element and on the corresponding pixels of which different points of said object are recorded;

a calculation part to calculate relative displacement amounts between positions of said object on said plurality of frame images which are produced by said frame image producing part;

an overlapping part to overlap said plurality of frame images after shifting said plurality of frame images from each other so that said positions of said object on said plurality of frame images are overlaid with each other on the basis of said relative displacement amounts;

a synthesized still image producing part to produce a synthesized still image of said object as an image containing an amount of information N (N being a natural number equal to or greater than 2) times as large as that of each of the frame images; and an interpolation processing part to carry out an interpolation processing by a Fourier series expansion of a distribution state of pixels on said synthesized still image so that the intervals of adjacent distributed on said synthesized still image are substantially the same.

10. A still image capture system according to claim 9, wherein said interpolation processing part obtains a resolution $N^{1/2}$ times as large as that of each of said plurality of frame images by distributing pixels on said synthesized still image as f $(x/N^{1/2}, y/N^{1/2})$ assuming that the number of terms of said Fourier series is the product of the number of said plurality of frame images and the predetermined number N (N being the number of frame images, on the corresponding pixels of which different points of said object are recorded, out of said plurality of frame images) and assuming the said Fourier series is f (x, y).

11. A still image capture system according to claim 10, wherein said interpolation processing part obtains a higher S/N ratio than that of each of said plurality of frame images by distributing pixels on said synthesized still image as f (x, y) assuming that the number of frames of said Fourier series is equal to the number of pixels of said plurality of frame images and assuming that said Fourier series is f (x, y).

12. A still image capture system according to claim 9, wherein the number of said plurality of frame images, which are produced by said a frame image producing part, is a predetermined number $m^2$ (m being a natural number equal to or greater than 2).

13. A still image capture system according to claim 9, wherein each of said plurality of frame images, which are produced by said frame image producing part, is recorded for substantially the same exposure time.

14. A still image capture system according to claim 9, wherein said synthesized still image, which is produced by said synthesized still image producing part, has a substantially larger number of pixels than that of each of said frame images so as to have a higher resolution.

15. A still image capture system according to claim 9, wherein said synthesized still image, which is produced by said synthesized still image producing part, has a substantially larger amount of signals per pixel than that of each of said frame images so as to have a higher S/N ratio.

16. A still image capture system according to claim 9, wherein said image pickup element comprises a CCD image sensor or a CMOS sensor.

* * * * *